United States Patent
Choi et al.

(10) Patent No.: US 10,061,752 B2
(45) Date of Patent: Aug. 28, 2018

(54) METHOD AND APPARATUS FOR GENERATING A FONT OF WHICH STYLE IS CHANGEABLE

(71) Applicant: FOUNDATION OF SOONGSIL UNIVERSITY INDUSTRY COOPERATION, Seoul (KR)

(72) Inventors: Jae Young Choi, Seoul (KR); Sung Min Kim, Seoul (KR); Geun Ho Jeong, Seoul (KR)

(73) Assignee: FOUNDATION OF SOONGSIL UNIVERSITY INDUSTRY COOPERATION, Seoul (KR)

( * ) Notice: Subject to any disclaimer, the term of this patent is extended or adjusted under 35 U.S.C. 154(b) by 0 days.

(21) Appl. No.: 15/596,304

(22) Filed: May 16, 2017

(65) Prior Publication Data

US 2018/0046600 A1 Feb. 15, 2018

(30) Foreign Application Priority Data

Aug. 11, 2016 (KR) .................. 10-2016-0102459

(51) Int. Cl.
*G06F 17/21* (2006.01)
*G06T 11/20* (2006.01)
*G09G 5/26* (2006.01)

(52) U.S. Cl.
CPC .......... *G06F 17/214* (2013.01); *G06T 11/203* (2013.01); *G09G 5/26* (2013.01)

(58) Field of Classification Search
None
See application file for complete search history.

(56) References Cited

U.S. PATENT DOCUMENTS

2011/0249013 A1* 10/2011 Jones .................. G09G 5/28
345/582

OTHER PUBLICATIONS

Choi et al., "MFCONFIG: A Metafont plug-in module for the Freetype rasterizer", TUGboat, vol. 37, No. 2, 2016.*
Metaflop, "metaflop", https://www.metaflop.com/faq, 2014.*
Modulator, "modulator", https://www.metaflop.com/modulator, 2015.*
Andreas Krall, "Efficient JavaVM Just-in-Time Compilation", IEEE, 1998.*

* cited by examiner

*Primary Examiner* — Nicholas R Wilson
(74) *Attorney, Agent, or Firm* — Hauptman Ham, LLP

(57) ABSTRACT

A method and apparatus for generating a font of which style is changeable are disclosed. The disclosed method is a method for generating a font to be performed on an apparatus including a processor. The method comprises (a) setting a fixed style parameter which cannot change the style, wherein the fixed style parameter is included in style parameters, and a METAFONT consists of the style parameter and a letter drawing function, (b) generating an intermediate code based on the letter drawing function and the fixed style parameter; and (c) generating an output font by combining the intermediate code with a variable style parameter which can change the style, wherein the variable style parameter is included in the style parameter.

4 Claims, 8 Drawing Sheets

METHOD AND APPARATUS FOR GENERATING A FONT OF WHICH STYLE IS CHANGEABLE

PRIORITY

This application claims priority under 35 U.S.C. § 119(a) to a Korean patent application filed on Aug. 11, 2016 in the Korean Intellectual Property Office and assigned Serial No. 10-2016-0102459, the entire disclosure of which is incorporated herein by reference.

TECHNICAL FIELD

The present disclosure relates to method and apparatus for generating a font capable of variously changing in real time styles in a unit of a letter, without an arrangement process.

BACKGROUND ART

Text is an effective means for recording information and delivering the information. A user uses much more a digital font for expressing letters on a digital device than an analog font such as handwriting, according as a smart device is generalized. In this environment, various stylish digital fonts have been produced.

A bitmap font and an outline font are generally used as the digital font. The bitmap font expresses every letter in a bitmap image. Extra files for respective sizes of the letters must be designed, to support the size of the letters in the bitmap font. The outline font draws shape of the letters in a function, and representatively includes a True Type Font TTF. The TTF can change freely the size of the letter by a rasterizer calculating again an outline function, wherein the rasterizer performs an output operation.

FIG. 1 illustrates output concept of the conventional true type font. Referring to FIG. 1, corresponding style of the font may be outputted on a screen through the rasterizer only when true type font files corresponding to respective styles are designed. The rasterizer can again calculate an outline equation to adjust the output size of the true type font.

However, it is impossible to change the style other than the size of the letter in the true type font. Hence, font files corresponding to respective styles should be produced if various styles of the fonts are to be serviced. That is, the true type font expresses its style depending on the font file, and thus it is difficult to change the style freely.

SUMMARY

Accordingly, the invention is provided to substantially obviate one or more problems due to limitations and disadvantages of the related art. One embodiment of the invention provides method and apparatus for generating a font capable of variously changing in real time styles in a unit of a letter, without an arrangement process.

Other features of the invention may be thought by a person in an art through following embodiments.

In one embodiment, the invention provides a method for generating a font to be performed on an apparatus including a processor, the method comprising: (a) setting a fixed style parameter which cannot change the style, wherein the fixed style parameter is included in style parameters, and a METAFONT consists of the style parameter and a letter drawing function; (b) generating an intermediate code based on the letter drawing function and the fixed style parameter; and (c) generating an output font by combining the intermediate code with a variable style parameter which can change the style, wherein the variable style parameter is included in the style parameter.

In the step of (c), the intermediate code and the variable style parameter are combined by using a parameter mapping table.

The intermediate code is an assembly code.

In another embodiment, the invention provides an apparatus for generating a font based on a METAFONT, consisting of a letter drawing function and style parameters comprising: an output font generating unit configured to generate an output font by combining an intermediate code with a variable style parameter which can change the style, wherein the intermediate code is generated based on the letter drawing function and a fixed style parameter which cannot change the style, and the variable style parameter and the fixed style parameter are included in the style parameters.

Method and apparatus for generating a font according to one embodiment of the invention may variously change in real time styles in a unit of a letter, without performing an arrangement process.

BRIEF DESCRIPTION OF DRAWINGS

Example embodiments of the present invention will become more apparent by describing in detail example embodiments of the present invention with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

Hereinafter, various embodiments of the invention will be described in detail with reference to accompanying drawings.

Hereinafter, concept of METAFONT will be described as basics of the invention.

The METAFONT corresponds to a font supplement system used in TeX, and consists of a letter drawing function of expressing a method of drawing every letter and a style parameter for making up a letter. That is, the method of drawing the letter is predetermined, but the style parameter (style value) for determining style is not determined. Accordingly, the METAFONT may freely change a font of the letter to desired style of a font by changing the style parameter.

Figure 1:
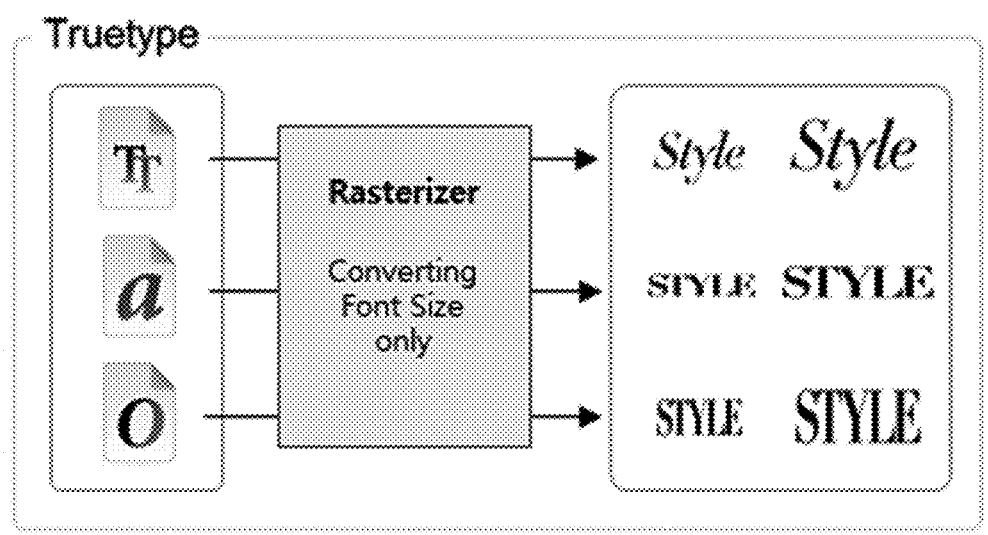
FIG. 1 illustrates output concept of the conventional true type font.
Figure 2:
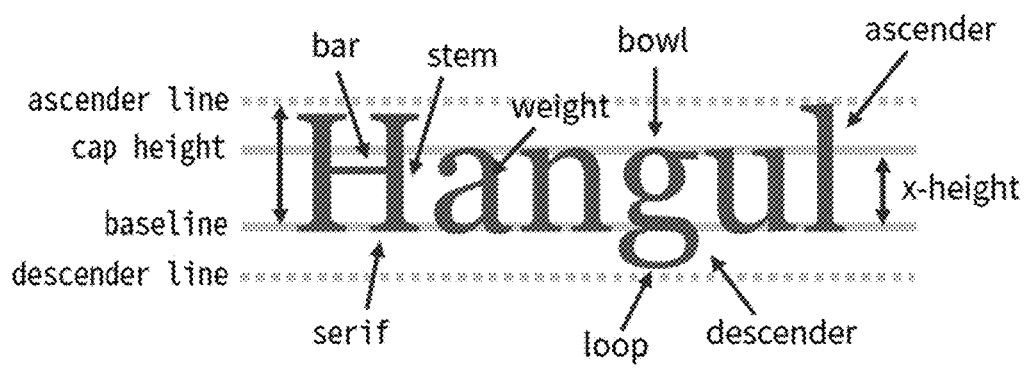
FIG. 2 to FIG. 4 are views illustrating examples of style parameters.
Figure 3:
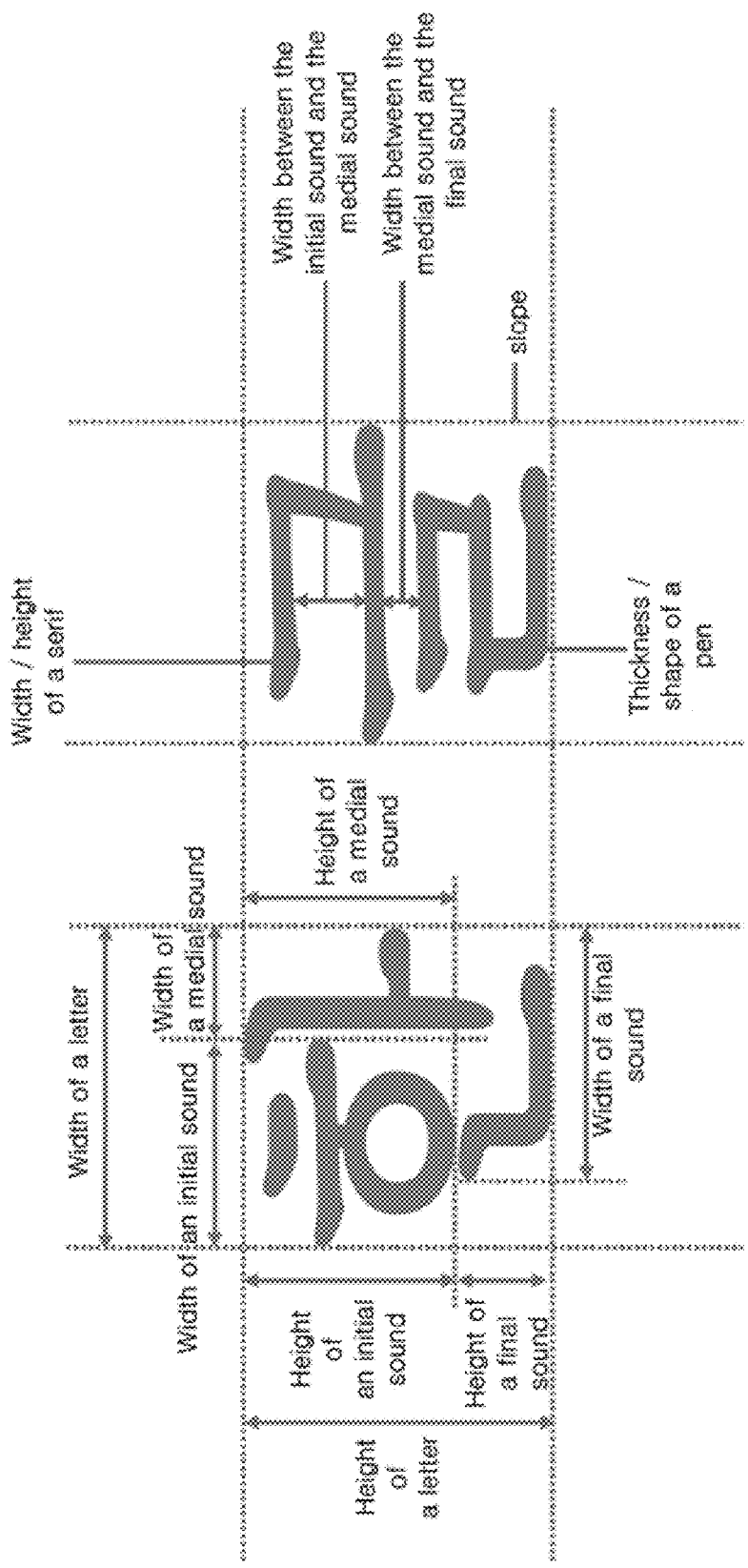
Figure 4:
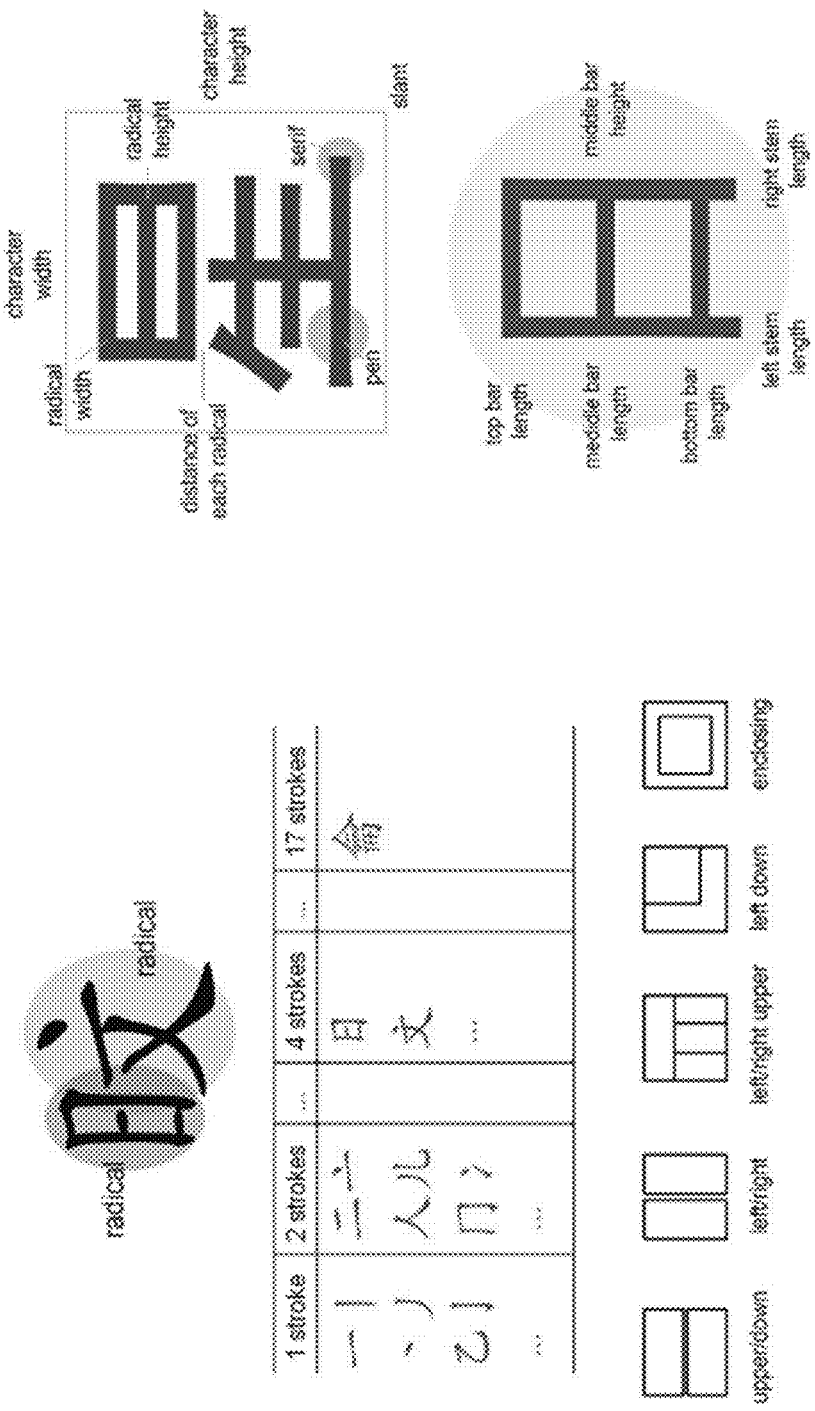

FIG. 2 to FIG. 4 are views illustrating examples of style parameters.

Particularly, FIG. 2 shows an example of the style parameter for an English letter. The style parameter for the English letter includes an ascender, a descender, an ascender line, and a descender line defining the range in which an alphabet is shown, cap height, x-height, a baseline which is a location reference line of the letter, a stem, a weight, a bowl, a loop, a serif and so on.

FIG. 3 illustrates an example of a style parameter for a Korean letter. The style parameter for the Korean letter includes width/height of the letter, width/height of an initial sound, width/height of a medial sound, width/height of a final sound, width/height of a serif, width between the initial sound and the medial sound, width between the medial sound and the final sound, a slope, a thickness/shape of a pen, etc.

FIG. 4 shows an example of a style parameter for a Chinese character. The style parameter for the Chinese character includes width/height of a letter, radical width/height, width between radicals, a slope, thickness/shape of a pen, a serif, width/height of a top bar, width/height of a middle bar, width/height of a bottom bar, etc.

Figure 5:
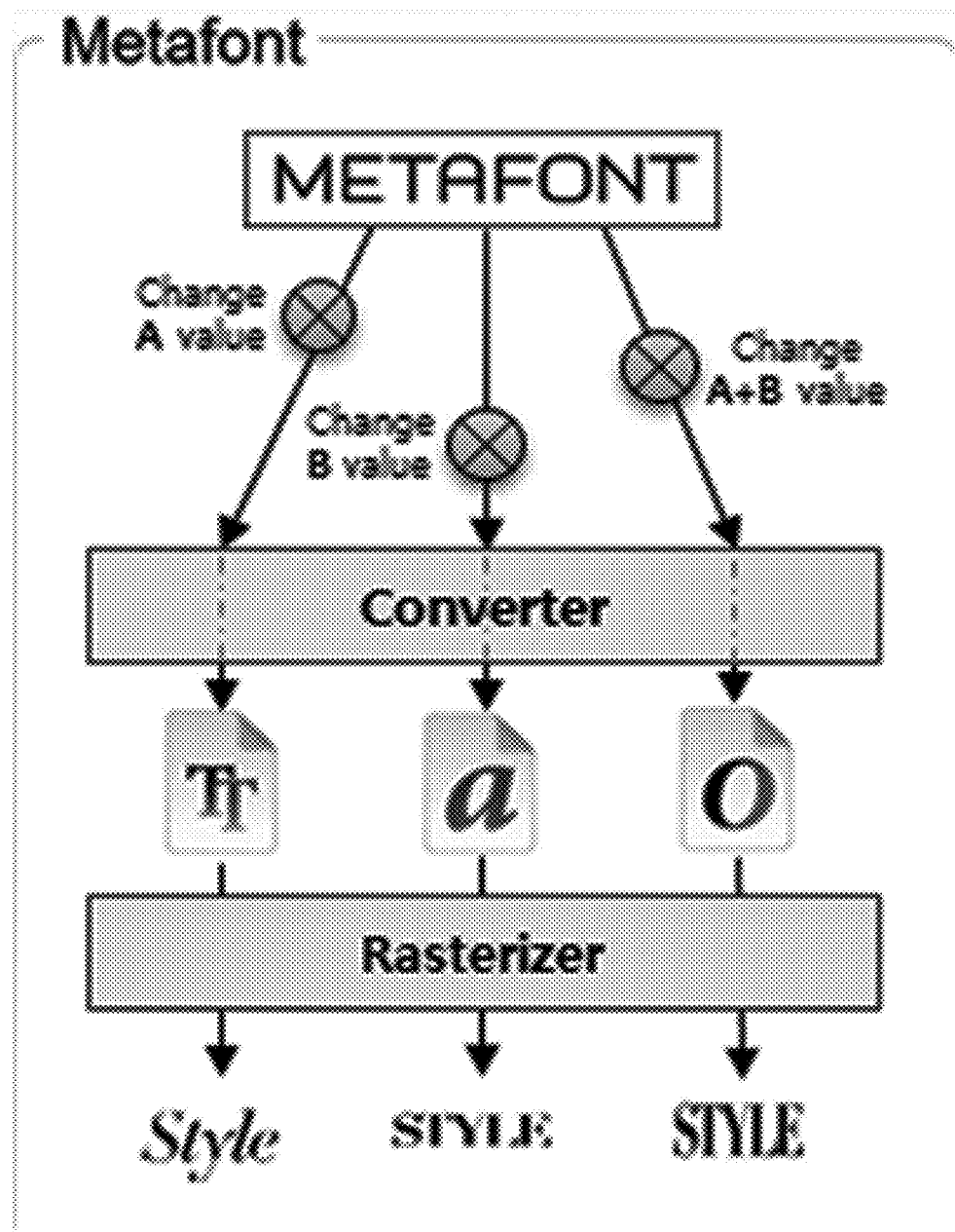
FIG. 5 illustrates an output concept of a font according to the conventional METAFONT.

FIG. 5 illustrates an output concept of a font according to the conventional METAFONT.

For example, in usage of the METAFONT, when using a font having a thickness smaller than a font having default thickness, a style parameter for determining the thickness may be changed. A style parameter for determining a slope value may be changed when changing a slope of a letter.

Figure 6:
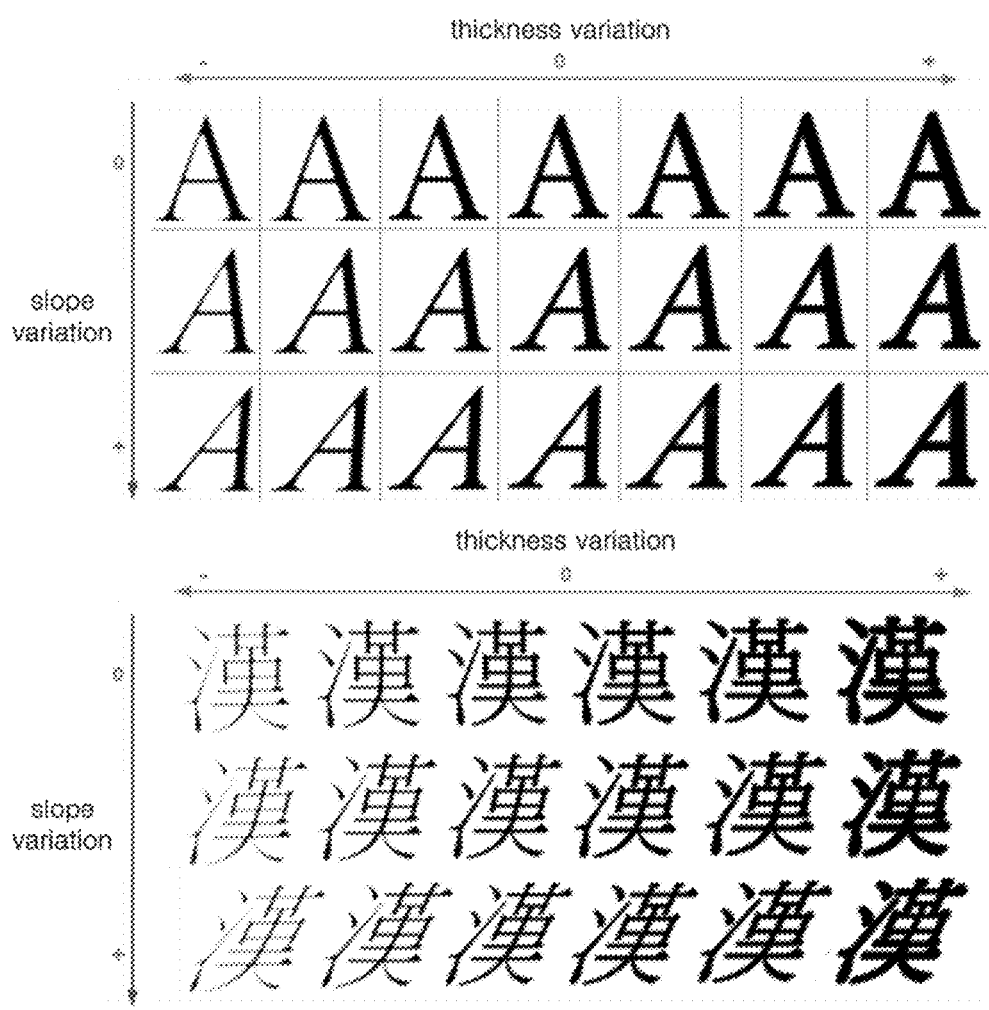
FIG. 6 is a view illustrating diverse styles of fonts derived from one METAFONT in view of thickness and slope.

FIG. 6 is a view illustrating diverse styles of fonts derived from one METAFONT in view of thickness and slope. In FIG. 6, various styles of fonts are generated by using one METAFONT. FIG. 6 illustrates English letter 'A' and Chinese character ' 漢 ' to which two style values are applied. Since diverse styles of fonts can be provided by using the METAFONT, the user may be highly satisfied.

However, when generating the font depending on request of the user, the problem arises, that the conventional META-FONT performs all steps again in a font generation process from the beginning.

The invention provides a technique for solving this problem. Various embodiments of the invention will be described in detail with reference to accompanying drawings FIG. 7 and FIG. 8.

Figure 7:
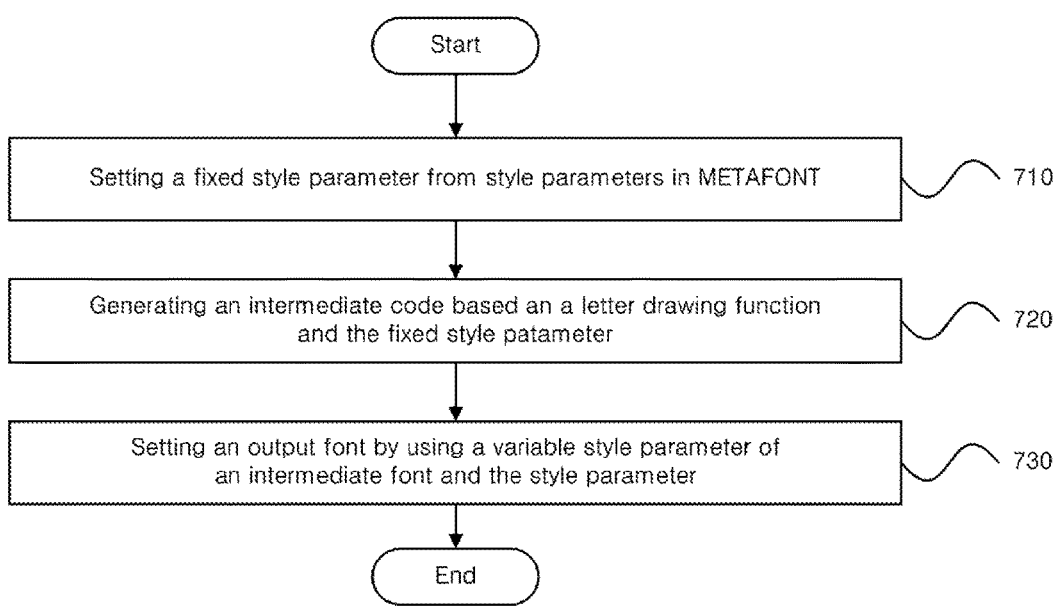
FIG. 7 is a flowchart illustrating a process of generating a font according to one embodiment of the invention.

FIG. 7 is a flowchart illustrating a process of generating a font according to one embodiment of the invention. The process may be performed by an apparatus including a processor. Hereinafter, steps in the process will be described.

In a step of 710, a fixed style parameter is set from style parameters in the METAFONT.

That is, the METAFONT consists of the letter drawing function and the style parameter as mentioned above, and the fixed style parameter, of which style can't be changed, is set from the style parameters in the METAFONT. The fixed style parameter should not be amended.

Here, the fixed style parameter can be set by a font producer, and it is the style parameter corresponding to a basic value which corresponds to the frame of the font. The fixed style parameter is a fixed value not changeable and it is included in an intermediate code described below. Here, the font producers can differently set the fixed style parameter.

For example, the output range (ascender line, descender line) of the alphabet, the baseline as the location reference line of the letter, the cap height, etc. may be the fixed styled parameter. Referring to FIG. 3, combination elements (initial sound, medial sound, final sound) of Korean letter, output range of the letter (top line, bottom line, left line, right line), width between the initial sound/the medial sound/the final sound, etc. may be the fixed style parameter.

In a step of 720, the intermediate code is generated based on the letter drawing function and the fixed style parameter. Here, the intermediate code may be an assembly code which is a machine code. That is, in the step of 720, the intermediate code as the assembly code is generated by inputting the fixed style parameter in the letter drawing function, and it may correspond to a basic font.

In other words, in the step of 720, optimized intermediate code is produced by redefining and rearranging the META-FONT developed in a program code through a specific rule. Since the fixed style parameter is not changed, it can be directly applied to the assembly code.

Briefly, the intermediate code fixes the fixed style parameter so that a value of the fixed style parameter is not changed. As a result, intrinsic frame of the font designed by the font producer may not be changed and excessive letter transformation or unreadable transformation, etc. may be prevented, although the style of the font is changed by using the same variable style parameter.

On the other hand, the METAFONT includes a font set value used basically as well as the style parameter for determining the style. The font set values mean basic values for using the METAFONT, and they may be referred to as meta data. In one embodiment, the font set values may be included in the fixed style parameter.

For example, the font set values may include signature or version information of the font producer, applicable META-FONT engine version, log record parameter of a compile, the other data added according to object of the font producer and so on. The METAFONT had the demerits in that copyright or duty and right of the font is weak because corresponding font set values can be changed. The invention may solve the demerits by fixing the font set value in the intermediate code.

In the step of 730, an output font is set by using the intermediate code and the variable style parameter, wherein the variable style parameter is included in the style parameter.

In other words, the style parameter includes the variable style parameter which can change the style as well as the fixed style parameter. In the step of 730, the output font is generated by inputting the variable style parameter to the intermediate code.

Here, the variable style parameter may be set by a user of the font, and it is set by user's request. For example, the variable style parameter may include thickness, slope, serif, etc. of the font.

Particularly referring to FIG. 2, attributes including bar, stem, weight, bowl, loop, etc. are needed for expressing the thickness of the English letter. The thickness of the letter may be variously expressed when width change of each of the attributes is complexly applied. In this case, the slope of the letter is expressed by applying complex attributes including the stem, the weight, etc. The serif for expressing an end shape (bending) of the letter may also be changeable.

Accordingly, the stem, the weight, the bowl, the loop, the serif, etc. may correspond to the variable style parameter.

In FIG. 3, in the Korean letter, element of expressing the thickness of the letter, the serif, the slope of the letter, etc. may correspond to the variable style parameter.

In one embodiment, in the step of 730, the output font may be generated by combining the intermediate code and the variable style parameter using a parameter mapping table. Here, the parameter mapping table indicates a guide table when inputting the variable style parameter in the intermediate code.

Shortly, the output font generated by the method of generating the font of the invention is new font including characteristic of the METAFONT capable of changing the style freely and characteristic of the true type font capable of rasterizing in a unit of the letter. The output font will be referred as STEMFONT. The STEMFONT generates assembly code type intermediate code by using the letter drawing function and the fixed style parameter which is not changeable. The intermediate code is lighter than the font of the conventional METAFONT and it is a code optimized for outputting the font.

That is, the method generates in advance the intermediate code and inputs only the variable style parameter in the intermediate code, thereby reducing a repetition process because every process of generating the font is not performed. Accordingly, the time taken for producing the font and cost may also reduce.

In other words, the STEMFONT may employ various styles of fonts with one file, and so it is not necessary to produce multiple font files such as a conventional font family. Additionally, the STEMFONT may satisfy diverse demands of the users who want to use various styles of fonts because the style of the font can be freely changed in real time.

Figure 8:
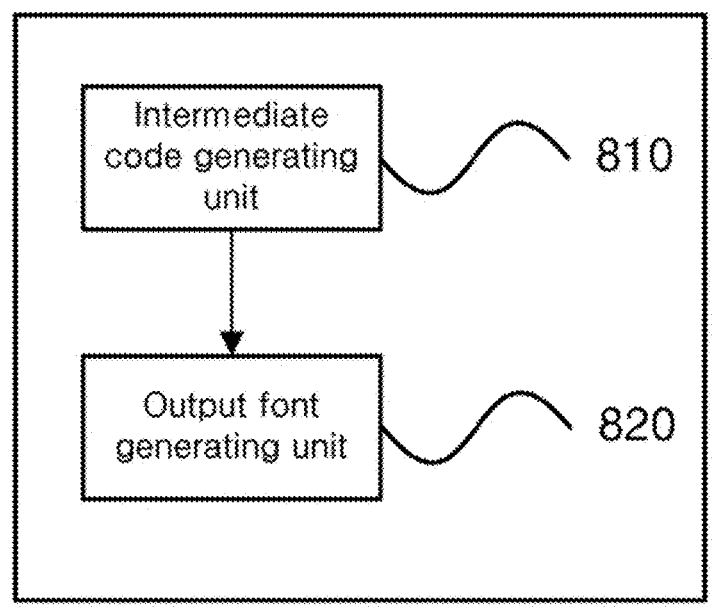
FIG. 8 is a view illustrating schematically an apparatus for generating the font according to one embodiment of the invention.

FIG. 8 is a view illustrating schematically an apparatus for generating the font according to one embodiment of the invention.

In FIG. 8, the apparatus for generating the font 800 may be included in a terminal, and may provide a font based on the METAFONT including the letter drawing function and the style parameter. Here, the terminal means every microprocessor based apparatus including a desktop computer, a mobile terminal, a PDA, a laptop, a tablet PC, etc.

The apparatus 800 includes an intermediate code generating unit 810 and an output font generating unit 820. Hereinafter, elements of the font generation apparatus 800 will be described.

The intermediate code generating unit 810 generates the intermediate code based on the letter drawing function and the fixed style parameter which cannot change the style, wherein the fixed style parameter included in the style parameter.

The intermediate code may be received in advance from a terminal or a server of the font producer and then stored. In this time, the intermediate code generating unit 810 does not perform any operation.

The output font generating unit 820 generates the output font by combining the intermediate code with the variable style parameters which can change the style.

Here, the output font generating unit 820 may combine the intermediate code with the variable style parameter by using the parameter mapping table. The intermediate code may be an assembly code.

In the above description, the embodiments of the font generation apparatus 800 are described. The method of generating the font in FIG. 7 is applicable to the embodiment of the invention. Related description will be omitted.

The technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer using an interpreter, etc. The hardware mentioned above can be built to operate as one or more software modules that perform the actions of the embodiments of the invention, and vice versa.

Components in the embodiments described above can be easily understood from the perspective of processes. That is, each component can also be understood as an individual process. Likewise, processes in the embodiments described above can be easily understood from the perspective of components. The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

The invention claimed is:

1. A method for generating a font based on a METAFONT consisting of a letter drawing function and a style parameter, the method performed by an apparatus including a processor, the method comprising:
   (a) setting a fixed style parameter, wherein the fixed style parameter is included in the style parameter and corresponds to an intrinsic frame of the font designed by a font producer, and a value of the fixed style parameter is not changed;
   (b) generating an intermediate code by inputting the fixed style parameter in the letter drawing function; and
   (c) generating an output font by combining the intermediate code with a variable style parameter, wherein the variable style parameter is included in the style parameter and is set by a request from a user, and a value of the variable style parameter is changed.

2. The method of claim 1, wherein in the step of (c), the intermediate code and the variable style parameter are combined by using a parameter mapping table.

3. The method of claim 1, wherein the intermediate code is an assembly code.

4. A non-transitory computer readable storage medium storing a program to perform a method for generating a font based on a METAFONT consisting of a letter drawing function and a style parameter, the method the method performed by an apparatus including a processor, the method comprising:
   (a) setting a fixed style parameter, wherein the fixed style parameter is included in the style parameter and corresponds to an intrinsic frame of the font designed by a font producer, and a value of the fixed style parameter is not changed;

(b) generating an intermediate code by inputting the fixed style parameter in the letter drawing function; and (c) generating an output font by combining the intermediate code with a variable style parameter, wherein the variable style parameter is included in the style parameter and is set by a request from a user, and a value of the variable style parameter is changed.

* * * * *